US011380500B2

United States Patent
Tokoyoda et al.

(10) Patent No.: US 11,380,500 B2
(45) Date of Patent: Jul. 5, 2022

(54) DIRECT-CURRENT CIRCUIT BREAKER

(71) Applicant: Mitsubishi Electric Corporation, Tokyo (JP)

(72) Inventors: Sho Tokoyoda, Tokyo (JP); Takashi Inagaki, Tokyo (JP); Kenji Kamei, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/277,523

(22) PCT Filed: Dec. 10, 2018

(86) PCT No.: PCT/JP2018/045273
§ 371 (c)(1),
(2) Date: Mar. 18, 2021

(87) PCT Pub. No.: WO2020/121369
PCT Pub. Date: Jun. 18, 2020

(65) Prior Publication Data
US 2021/0358702 A1    Nov. 18, 2021

(51) Int. Cl.
*H01H 33/59*    (2006.01)
*H02H 3/087*    (2006.01)
*H02H 3/22*     (2006.01)
*H01H 33/16*    (2006.01)

(52) U.S. Cl.
CPC .......... *H01H 33/596* (2013.01); *H02H 3/087* (2013.01); *H02H 3/22* (2013.01); *H01H 33/16* (2013.01)

(58) Field of Classification Search
CPC ............ H02H 3/087; H02H 3/22; H01H 9/54; H01H 9/541; H01H 9/542;
(Continued)

(56) References Cited

U.S. PATENT DOCUMENTS

| 8,270,128 B2* | 9/2012 | Munakata | H01H 33/596 361/4 |
| 2016/0322178 A1* | 11/2016 | Park | H01H 33/596 |
| 2016/0329179 A1* | 11/2016 | Kim | H01H 9/547 |
| 2018/0041021 A1* | 2/2018 | Backman | H01H 9/542 |

FOREIGN PATENT DOCUMENTS

| EP | 2221845 A1 | 8/2010 |
| EP | 3654359 A1 | 5/2020 |

(Continued)

OTHER PUBLICATIONS

R. Cao, W. Gao, L. Li and X. Zhao, "Research and design of a layout structure suitable for active loop used in DC circuit breaker based on artificial current zero technology" Retrieved from the Internet: <URL: https://ieeexplore.ieee.org/stamp/stamp.jsp?tp=&arnumber=8188876> (Year: 2017).*

(Continued)

*Primary Examiner* — Jared Fureman
*Assistant Examiner* — Nicolas Bellido
(74) *Attorney, Agent, or Firm* — Buchanan Ingersoll & Rooney PC

(57) ABSTRACT

A direct-current circuit breaker includes a circuit breaker unit and a circuit unit that generates an oscillating current. The circuit unit includes a capacitor and a reactor, a high-speed closer, and a lightning arrester. The circuit breaker unit and the high-speed closer are aligned in a first direction with a distance therebetween that is equal to or longer than a certain spatial distance. The capacitor and the lightning arrester are aligned in a second direction intersecting the first direction with a distance therebetween that is equal to or longer than the spatial distance. A combination of the circuit breaker unit with the high-speed closer and a combination of the capacitor with the lightning arrester are aligned in a third direction intersecting the first direction and the second direction with a distance therebetween that is equal to or longer than the spatial distance.

4 Claims, 3 Drawing Sheets

(58) Field of Classification Search
CPC ....... H01H 2009/543; H01H 2009/544; H01H 2009/545; H01H 2009/546; H01H 9/547; H01H 9/548; H01H 9/563; H01H 2009/566; H01H 9/56; H01H 33/596; H01H 33/59; H01H 33/593

See application file for complete search history.

(56) References Cited

FOREIGN PATENT DOCUMENTS

| | | | | |
|---|---|---|---|---|
| JP | 2003123569 A | * | 4/2003 | |
| JP | 2010192305 A | | 9/2010 | |
| JP | 6328356 B1 | | 5/2018 | |
| WO | WO-2018229970 A1 | * | 12/2018 | |
| WO | WO-2018230224 A1 | * | 12/2018 | ........... H01H 33/596 |

OTHER PUBLICATIONS

International Search Report (PCT/ISA/210) with translation and Written Opinion (PCT/ISA/237) dated Mar. 5, 2019, by the Japan Patent Office as the International Searching Authority for International Application No. PCT/JP2018/045273.
Extended European Search Report dated Nov. 26, 2021, issued in corresponding European Application No. 18943317.0. (8 pages).
Wu et al., "External Insulation Design of Converter Stations for Xiangjiaba-Shanghai +800 kV UHVDC Project", Power System Technology (POWERCON), 2010 International Conference On, IEEE, Piscataway, NJ, USA, Oct. 24, 2010, pp. 1-7, XP031834349.

* cited by examiner

DIRECT-CURRENT CIRCUIT BREAKER

FIELD

The present invention relates to a direct-current circuit breaker which interrupts a direct current.

BACKGROUND

As one of methods of interruption using a direct-current circuit breaker, a method is known in which a current zero point is formed by superimposing an oscillating current on a direct current to interrupt the direct current at the current zero point.

Patent Literature 1 discloses a direct-current circuit breaker including a circuit breaker unit inserted in a direct-current line and a resonance circuit which generates an oscillating current. In the direct-current circuit breaker of Patent Literature 1, the circuit breaker unit and components of the resonance circuit are installed on a shared frame, and thereby the circuit breaker unit and the resonance circuit are integrated and located in a switchboard.

CITATION LIST

Patent Literature

Patent Literature 1: Japanese Patent Application Laid-open No. 2010-192305

SUMMARY

Technical Problem

In direct-current circuit breakers, it is necessary to provide a spatial distance for insulation between sites having different potentials. The higher the rated voltage of such a direct-current circuit breaker, the longer the spatial distance required for insulation in the direct-current circuit breaker, and therefore the more restriction on a physical configuration thereof. In the conventional technique disclosed in Patent Literature 1 described above, it is difficult to provide a spatial distance for insulation between respective components when the rated voltage of the direct-current circuit breaker is higher than that when the direct-current circuit breaker is located in a switchboard, for example, when the rated voltage is 70 kV or higher. In addition, according to the conventional technique disclosed in Patent Literature 1 described above, as the spatial distance between the components increases, the configuration of the direct-current circuit breaker increases in size, which may result in difficulty in installation of the direct-current circuit breaker. The direct-current circuit breakers are required to be able to ensure insulation between sites having different potentials and to prevent the configuration thereof from increasing in size.

The present invention has been made in view of the above, and an object thereof is to obtain a direct-current circuit breaker capable of ensuring insulation between sites having different potentials and preventing the configuration thereof from increasing in size.

Solution to Problem

In order to solve the above-described problems and achieve the object, a direct-current circuit breaker according to the present invention interrupts a direct current at a current zero point formed by superimposing an oscillating current on the direct current flowing through a direct-current line. The direct-current circuit breaker according to the present invention includes a circuit breaker unit inserted in the direct-current line, and a circuit unit that is connected in parallel to the circuit breaker unit and generates the oscillating current. The circuit unit includes a capacitor and a reactor that are connected in series to each other and generate the oscillating current, a high-speed closer that is connected in series to the capacitor and performs closing for forming the current zero point, and a lightning arrester that reduces an overvoltage of the capacitor, the lightning arrester being connected in parallel to the capacitor and the high-speed closer. The circuit breaker unit and the high-speed closer are aligned in a first direction with a distance provided therebetween, the distance being equal to or longer than a certain spatial distance. The capacitor and the lightning arrester are aligned in a second direction that is a direction intersecting the first direction with a distance provided therebetween, the distance being equal to or longer than the spatial distance. A combination of the circuit breaker unit with the high-speed closer and a combination of the capacitor with the lightning arrester are aligned in a third direction that is a direction intersecting the first direction and the second direction with a distance provided therebetween, the distance being equal to or longer than the spatial distance.

Advantageous Effects of Invention

The present invention achieves an effect that it is possible to ensure insulation between sites having different potentials and to prevent the configuration from increasing in size.

DESCRIPTION OF EMBODIMENTS

Hereinafter, a direct-current circuit breaker according to each embodiment of the present invention will be described in detail with reference to the drawings. The present invention is not limited to the embodiments.

First Embodiment

Figure 1:
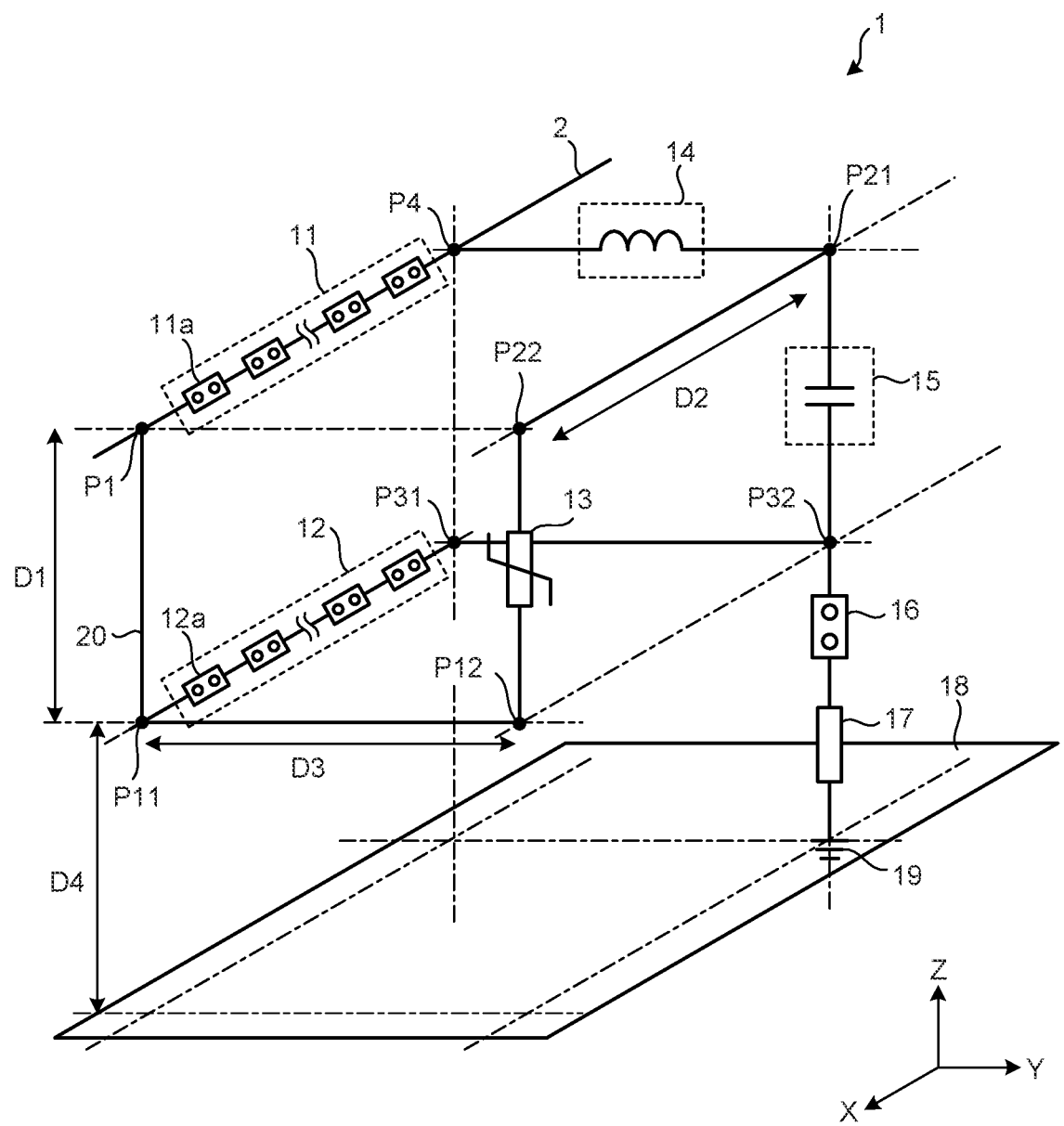
FIG. 1 is a schematic diagram illustrating a configuration of a direct-current circuit breaker according to a first embodiment of the present invention.
Figure 2:
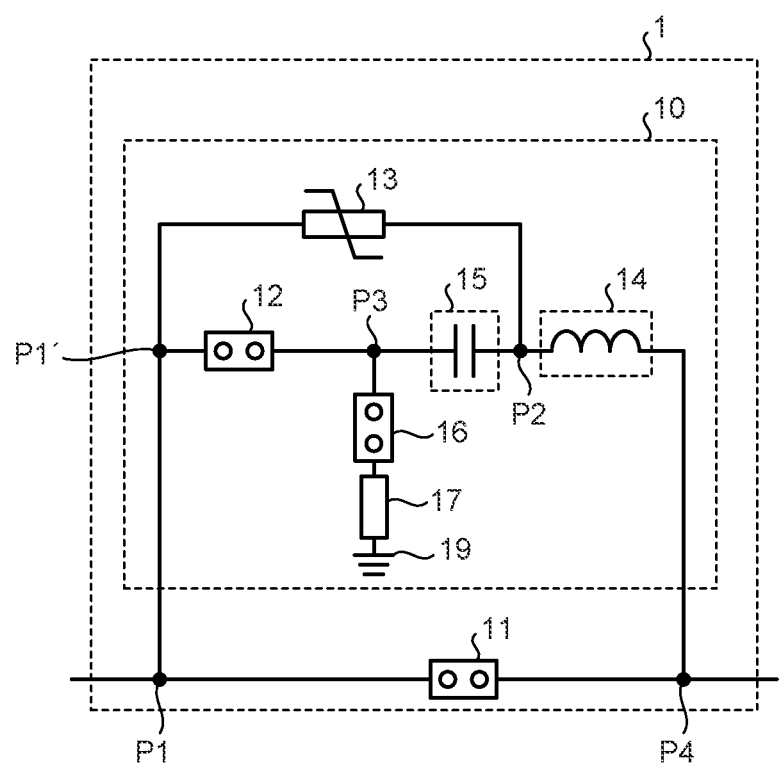
FIG. 2 is a circuit diagram of the direct-current circuit breaker according to the first embodiment.

FIG. 1 is a schematic diagram illustrating a configuration of a direct-current circuit breaker 1 according to a first embodiment of the present invention. FIG. 2 is a circuit diagram of the direct-current circuit breaker 1 according to the first embodiment. The direct-current circuit breaker 1 is a mechanical circuit breaker of a forced-extinction type. The direct-current circuit breaker 1 is provided on a direct-current line 2 of a power system. The direct-current circuit breaker 1 interrupts a direct current at a current zero point formed by superimposing an oscillating current on the direct current flowing through the direct-current line 2. The direct-current circuit breaker 1 interrupts a short-circuit current or an earth fault current upon occurrence of an accident, thereby protecting a load facility.

Components of the direct-current circuit breaker 1 are three-dimensionally arranged in a three-dimensional space. In FIG. 1, the three-dimensional arrangement of the components and the connection between the components are schematically illustrated.

Here, the components of the direct-current circuit breaker 1 will be described with reference to FIG. 2. The direct-current circuit breaker 1 includes a circuit breaker unit 11 inserted in the direct-current line 2, and a circuit unit 10 which is connected in parallel to the circuit breaker unit 11 and generates an oscillating current. The circuit unit 10 functions as a resonance circuit. When in a steady state, i.e., when the power system is in a steady state, the circuit breaker unit 11 is closed and a direct current flows through the direct-current line 2. When an accident occurs in the power system, the circuit breaker unit 11 performs an opening operation, and thereby the direct-current circuit breaker 1 interrupts the direct current. The opening operation is an operation to an open state from a closed state.

The circuit unit 10 includes a capacitor 15 and a reactor 14 which are connected in series to each other and generate an oscillating current, and a high-speed closer 12 which is connected in series to the capacitor 15 and performs closing for forming a current zero point. The circuit unit 10 further includes a lightning arrester 13 for reducing an overvoltage of the capacitor 15, the lightning arrester 13 being connected in parallel to the capacitor 15 and the high-speed closer 12.

One end of the high-speed closer 12 is connected to point P1 on an upstream side of the circuit breaker unit 11 in the direct current. The other end of the high-speed closer 12 is connected to one electrode of the capacitor 15. One end of the reactor 14 is connected to point P4 on a downstream side of the circuit breaker unit 11 in the direct current. The other end of the reactor 14 is connected to the other electrode of the capacitor 15. One end of the lightning arrester 13 is connected to point P1' between point P1 and the high-speed closer 12. The other end of the lightning arrester 13 is connected to point P2 between the capacitor 15 and the reactor 14.

The circuit unit 10 further includes a charging resistor 17 for charging the capacitor 15 by a direct-current voltage of the direct-current line 2 when in the steady state, and a disconnector 16 provided between the capacitor 15 and the charging resistor 17. One end of the disconnector 16 is connected to point P3 between the high-speed closer 12 and the capacitor 15. The charging resistor 17 is connected between the other end of the disconnector 16 and a ground electrode 19.

When in the steady state, the circuit breaker unit 11 is closed and the high-speed closer 12 is open. The capacitor 15 is charged by the direct-current voltage when in the steady state. When an accident occurs, the circuit breaker unit 11 performs the opening operation and the high-speed closer 12 performs a closing operation. The closing operation is an operation to the closed state from the open state. When the high-speed closer 12 is closed, electric charges from a capacitor 15 are discharged to a loop including the high-speed closer 12, the capacitor 15, the reactor 14, and the circuit breaker unit 11. When the electric charges are discharged from the capacitor 15, an oscillating current which passes through the reactor 14, the circuit breaker unit 11, and the high-speed closer 12 flows from the capacitor 15. As a result, the direct-current circuit breaker 1 superimposes, on an accident current at the circuit breaker unit 11, the oscillating current in a direction opposite to the direction of the direct current, which is the accident current. When the current zero point is formed by superimposing the oscillating current on the accident current, the extinction of arc is completed in the circuit breaker unit 11 during the opening operation. The lightning arrester 13 reduces an overvoltage generated during the opening operation by the circuit breaker unit 11.

When the power system returns to the steady state, the disconnector 16 performs the closing operation. By the disconnector 16 in a closed state, a current flows from the direct-current line 2 to the capacitor 15, and the capacitor 15 is charged. When the charging of the capacitor 15 is completed, the disconnector 16 performs the opening operation. In order to compensate for a decrease in electric charges due to a leakage current from the capacitor 15, the capacitor 15 is charged at any time when in the steady state.

Point P1, point P2, point P3, and point P4 are points having potentials different from one another in a circuit including the circuit breaker unit 11 and the circuit unit 10. Point P1 and point P1' are points having the same potential. In addition, each of points P1, P1', P2, P3, and P4 is a point where ground insulation is required.

Next, with reference to FIG. 1, the three-dimensional arrangement of the components of the direct-current circuit breaker 1 and the connection between the components will be described. In FIG. 1, X, Y, and Z directions are directions perpendicular to one another. The components are three-dimensionally arranged in the X, Y, and Z directions. The Z direction is a vertical direction. The X and Y directions are directions parallel to a horizontal direction. An installation surface 18 is a horizontal ground surface on which the direct-current circuit breaker 1 is installed. The ground electrode 19 is embedded below the installation surface 18.

Point P1 in FIG. 1 corresponds to point P1 in a circuit illustrated in FIG. 2. Point P1' illustrated in FIG. 2 is divided into two points P11 and P12 arranged at an interval in the Y direction in FIG. 1. Point P11 of the two points P11 and P12 is on a side of the high-speed closer 12. Point P12 is on a side of the lightning arrester 13.

Point P2 illustrated in FIG. 2 is divided into two points P21 and P22 arranged at an interval in the X direction in FIG. 1. Point P21 of points P21 and P22 is on a side of the capacitor 15. Point P22 is on a side of the lightning arrester 13. Point P3 illustrated in FIG. 2 is divided into two points P31 and P32 arranged at an interval in the Y direction in FIG. 1. Point P31 of points P31 and P32 is on a side of the high-speed closer 12. Point P32 is on a side of the capacitor 15. Point P4 in FIG. 1 corresponds to point P4 in the circuit illustrated in FIG. 2.

A wiring line 20 connects respective points on the basis of the circuit illustrated in FIG. 2. Points P11 and P12 are connected by the wiring line 20. In FIG. 1, points P1, P11, and P12 are points having the same potential. Points P21 and P22 are connected by the wiring line 20. Points P21 and P22 are points having the same potential. Points P31 and P32 are connected by the wiring line 20. Points P31 and P32 are points having the same potential.

The circuit breaker unit 11 includes a plurality of circuit breakers 11*a* connected in series. The circuit breakers 11*a* are aligned in the X direction. The high-speed closer 12 includes a plurality of switches 12*a* connected in series. The switches 12*a* are aligned in the X direction.

Here, a maximum value of a voltage applicable to respective points having potentials different from each other is defined as 1.0 PU, and a certain spatial distance required for insulation between sites to which a voltage of 1.0 PU is applied is defined as an insulation distance. The circuit breaker unit 11 and the high-speed closer 12 are aligned in a first direction with distance D1 provided therebetween, distance D1 being equal to or longer than the insulation distance. In the first embodiment, the first direction is the Z direction. The circuit breaker unit 11 is arranged above the high-speed closer 12.

The capacitor 15 is divided into a plurality of capacitors stacked in the Z direction. The lightning arrester 13 is divided into a plurality of lightning arresters stacked in the Z direction. In FIG. 1, the illustration of the capacitors constituting the capacitor 15 and the lightning arresters constituting the lightning arrester 13 is omitted. The lightning arrester 13 and the capacitor 15 are aligned in a second direction with distance D2 provided therebetween, distance D2 being equal to or longer than the insulation distance. The second direction is a direction which intersects the first direction. In the first embodiment, the second direction is the X direction.

A combination of the circuit breaker unit 11 with the high-speed closer 12 and a combination of the lightning arrester 13 with the capacitor 15 are aligned in a third direction with distance D3 provided therebetween, distance D3 being equal to or longer than the insulation distance. The third direction is a direction which intersects the first direction and the second direction. In the first embodiment, the third direction is the Y direction. Distance D1, distance D2, and distance D3 are any distances equal to or longer than the insulation distance.

Each of the circuit breaker unit 11, the high-speed closer 12, the lightning arrester 13, the reactor 14, and the capacitor 15 is arranged at a position away from the installation surface 18 so as to be insulated from the installation surface 18. Each of the circuit breaker unit 11, the high-speed closer 12, the lightning arrester 13, the reactor 14, and the capacitor 15 is arranged at a position away from the installation surface 18 in the Z direction by a distance equal to or longer than distance D4. Distance D4 is a spatial distance required for ground insulation with respect to the installation surface 18. As a result, insulation of the circuit breaker unit 11, the high-speed closer 12, the lightning arrester 13, the reactor 14, and the capacitor 15 from the installation surface 18 is ensured.

In the example illustrated in FIG. 1, each of eight points P1, P4, P11, P12, P21, P22, P31, and P32 is arranged so as to correspond to one of eight corners of one rectangular parallelepiped. The length of each side of the rectangular parallelepiped is equal to or longer than the insulation distance. Each of the circuit breaker unit 11, the high-speed closer 12, the lightning arrester 13, the reactor 14, and the capacitor 15 is arranged so as to correspond to one of the sides constituting the rectangular parallelepiped. As described above, the respective components of the circuit breaker unit 11, the high-speed closer 12, the lightning arrester 13, the reactor 14, and the capacitor 15 are arranged to be three-dimensionally aligned in the three-dimensional space.

By such a positional relationship among the respective components, points having potentials different from each other out of points P1, P4, P11, P12, P21, P22, P31, and P32 are arranged at a distance equal to or longer than the insulation distance. The circuit breaker unit 11, the high-speed closer 12, the lightning arrester 13, the reactor 14, and the capacitor 15 are all arranged at a distance equal to or longer than the insulation distance. As a result, the direct-current circuit breaker 1 can ensure insulation between sites having different potentials.

In addition, the respective components can be connected so that none of the wiring lines 20 drawn between the respective components intersect each other by the three-dimensional arrangement of the respective components. In the direct-current circuit breaker 1, the respective components can be connected to by the wiring line 20 with simple routing.

The direct-current circuit breaker 1 can reduce the area of an XY plane, which is an area required for the installation of the respective components, as compared with a case of a planar arrangement in which the respective components are aligned on a plane. In addition, by employing, as arrangement of the respective components, a three-dimensional arrangement corresponding to the above-described rectangular parallelepiped, the direct-current circuit breaker 1 ensures insulation of each site with the use of the spatial distances in the three directions of the X direction, the Y direction, and the Z direction. Since the dimension of the direct-current circuit breaker 1 in each of the three directions does not need to significantly expand beyond a dimension corresponding to the insulation distance, it is possible to prevent the direct-current circuit breaker 1 from increasing in size in such a way that the dimension of the direct-current circuit breaker 1 in each of the three directions is significantly expanded beyond the dimension corresponding to the insulation distance. As a result, the direct-current circuit breaker 1 can prevent the configuration thereof from increasing in size while providing the insulation distance between the components.

The circuit breaker unit 11, the high-speed closer 12, the lightning arrester 13, the reactor 14, and the capacitor 15 do not have to be arranged along the sides of the rectangular parallelepiped. The arrangement of each of the circuit breaker unit 11, the high-speed closer 12, the lightning arrester 13, the reactor 14, and the capacitor 15 may be appropriately changed on the basis of a positional relationship corresponding to the rectangular parallelepiped. The first direction, the second direction, and the third direction are not limited to directions perpendicular to one another, and are only required to be directions which intersect one another.

Figure 3:
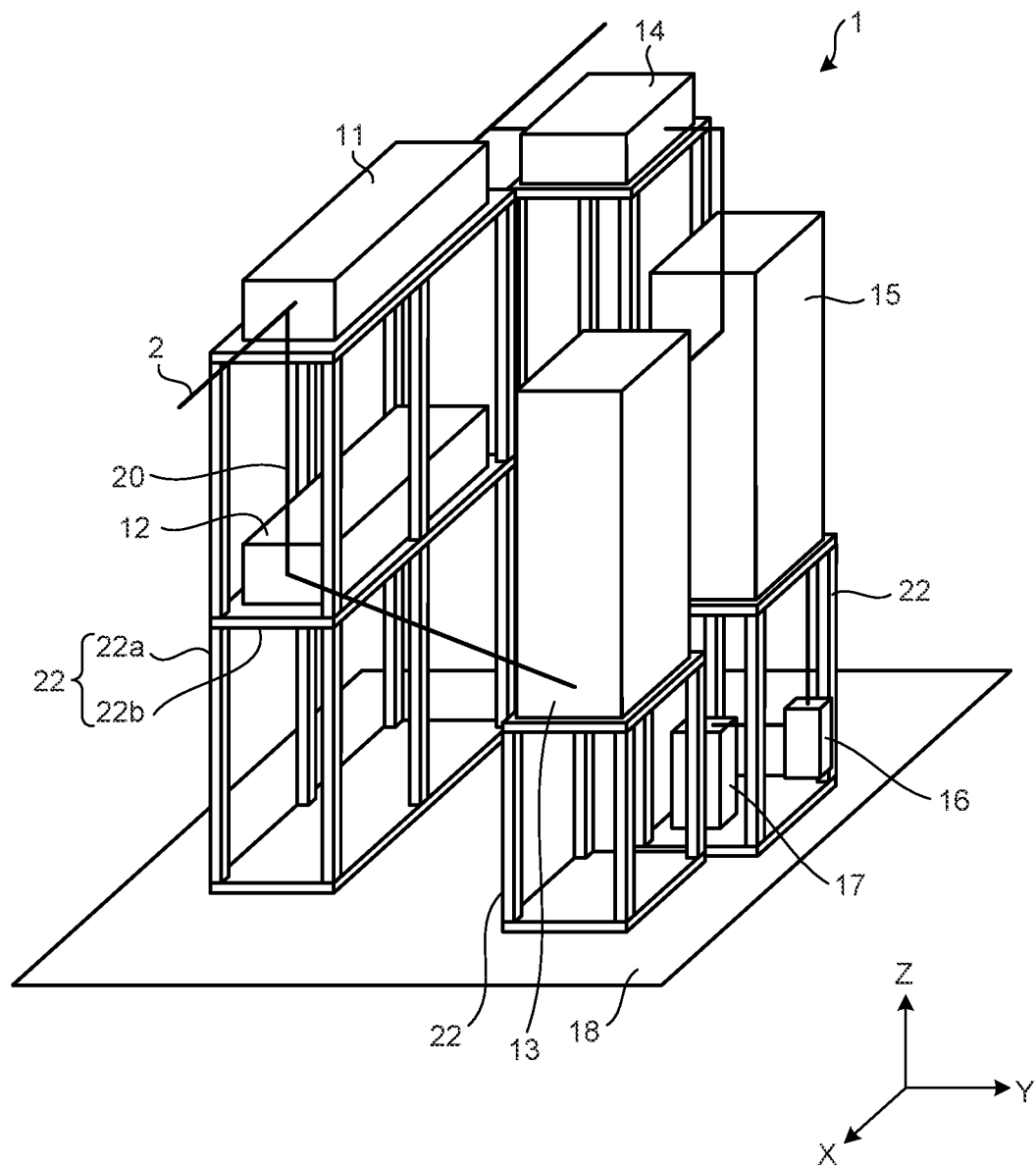
FIG. 3 is a diagram illustrating an example installation of the direct-current circuit breaker according to the first embodiment.

FIG. 3 is a diagram illustrating an example installation of the direct-current circuit breaker 1 according to the first embodiment. In FIG. 3, the illustration of the circuit breakers 11a and the switches 12a is omitted. A plurality of support bases 22 is set up on the installation surface 18. Each support base 22 includes a combination of a support post 22a set up in the vertical direction with a flat plate 22b horizontally supported by the support post 22a. An insulating material is used as a material for the support post 22a and the flat plate 22b.

The circuit breaker unit 11 and the high-speed closer 12 are arranged on the support base 22 shared thereby. The circuit breaker unit 11 is arranged on the flat plate 22b located at a position higher than the flat plate 22b on which the high-speed closer 12 is arranged. As a result, the circuit breaker unit 11 and the high-speed closer 12 are aligned in the Z direction with distance D1 provided therebetween. What is meant by "with distance D1 provided therebetween" is that a distance between an end of the circuit breaker unit 11 on a side of the high-speed closer 12 and an end of the high-speed closer 12 on a side of the circuit breaker unit 11 is distance D1.

The support base 22 on which the lightning arrester 13 is arranged and the support base 22 on which the capacitor 15 is arranged are aligned in the X direction. As a result, the lightning arrester 13 and the capacitor 15 are aligned in the X direction with distance D2 provided therebetween. What is meant by "with distance D2 provided therebetween" is that a distance between an end of the lightning arrester 13 on a side of the capacitor 15 and an end of the capacitor 15 on a side of the lightning arrester 13 is distance D2.

The support base 22 on which the lightning arrester 13 is arranged is aligned in the Y direction with the support base 22 on which the circuit breaker unit 11 and the high-speed closer 12 are arranged. The support base 22 on which the capacitor 15 is arranged is aligned in the Y direction with the support base 22 on which the circuit breaker unit 11 and the high-speed closer 12 are arranged. As a result, the combination of the circuit breaker unit 11 with the high-speed closer 12 and the combination of the lightning arrester 13 with the capacitor 15 are aligned in the Y direction with distance D3 provided therebetween. What is meant by "with distance D3 provided therebetween" is that a distance between an end of each of the circuit breaker unit 11 and the high-speed closer 12 on a side of the lightning arrester 13 and the capacitor 15, and an end of each of the lightning arrester 13 and the capacitor 15 on a side of the circuit breaker unit 11 and the high-speed closer 12 is distance D3.

The circuit breaker unit 11, the high-speed closer 12, the lightning arrester 13, the reactor 14, and the capacitor 15 are each arranged on the flat plate 22b located at a position higher than the installation surface 18. As a result, the circuit breaker unit 11, the high-speed closer 12, the lightning arrester 13, the reactor 14, and the capacitor 15 are each arranged at a position away from the installation surface 18 in the Z direction by a distance equal to or longer than distance D4. The disconnector 16 and the charging resistor 17 are arranged on the flat plate 22b of the support base 22 on which the capacitor 15 is arranged, the flat plate 22b being present on the installation surface 18.

The arrangement of the support base 22 is not limited to that illustrated in FIG. 3. Any arrangement may be employed as the arrangement of the support base 22 as long as the three-dimensional arrangement illustrated in FIG. 1 can be realized. In addition, the arrangement of the respective components of the direct-current circuit breaker 1 may be that obtained by vertically reversing the arrangement in the case illustrated in FIG. 1. The arrangement of the respective components of the direct-current circuit breaker 1 may be that obtained by rotating the arrangement in the case illustrated in FIG. 1 by 90 degrees around an X axis or a Y axis. The arrangement of the respective components of the direct-current circuit breaker 1 may be that obtained by laterally reversing the arrangement in the case illustrated in FIG. 1. Regarding the respective components, any orientation of the arrangement thereof may be employed as long as a relative positional relationship between the components satisfies the positional relationship illustrated in FIG. 1. The installation surface 18 may be a roof of a building other than the ground surface. The respective components of the direct-current circuit breaker 1 may be installed in a structure suspended from a roof inside a building.

According to the first embodiment, the circuit breaker unit 11 and the high-speed closer 12 are aligned in the first direction with a distance provided therebetween, the distance being equal to or longer than the insulation distance. The capacitor 15 and the lightning arrester 13 are aligned in the second direction with a distance provided therebetween, the distance being equal to or longer than the insulation distance. The combination of the circuit breaker unit 11 with the high-speed closer 12 and the combination of the capacitor 15 with the lightning arrester 13 are aligned in the third direction with a distance provided therebetween, the distance being equal to or longer than the insulation distance. The direct-current circuit breaker 1 can ensure insulation between sites having different potentials by the three-dimensional arrangement of the respective components of the circuit breaker unit 11, the high-speed closer 12, the lightning arrester 13, the reactor 14, and the capacitor 15. In addition, the direct-current circuit breaker 1 can prevent the configuration thereof from increasing in size by the three-dimensional arrangement of the respective components. As a result of the above, the direct-current circuit breaker 1 achieves an effect that it is possible to ensure insulation between sites having different potentials and to prevent the configuration thereof from increasing in size.

The configurations described in the embodiments above are merely examples of the content of the present invention and can be combined with other known technology and part thereof can be omitted or modified without departing from the gist of the present invention.

REFERENCE SIGNS LIST 1 direct-current circuit breaker; 2 direct-current line; 10 circuit unit; 11 circuit breaker unit; 11a circuit breaker; 12 high-speed closer; 12a switch; lightning arrester; 14 reactor; 15 capacitor; 16 disconnector; 17 charging resistor; 18 installation surface; 19 ground electrode; 20 wiring line; 22 support base; 22a support post; 22b flat plate.

The invention claimed is:

1. A direct-current circuit breaker that interrupts a direct current at a current zero point formed by superimposing an oscillating current on the direct current flowing through a direct-current line, the direct-current circuit breaker comprising:
   a circuit breaker inserted in the direct-current line; and
   a circuit portion connected in parallel to the circuit breaker unit to generate the oscillating current, wherein
   the circuit portion includes:
   a capacitor and a reactor connected in series to each other to generate the oscillating current;
   a high-speed closer connected in series to the capacitor to perform closing for forming the current zero point; and
   a lightning arrester to reduce an overvoltage of the capacitor, the lightning arrester being connected in parallel to the capacitor and the high-speed closer,
   the circuit breaker and the high-speed closer are aligned in a first direction with a distance provided therebetween, the distance being equal to or longer than a spatial distance for insulation between sites having potentials different from each other,
   the capacitor and the lightning arrester are aligned in a second direction that is a direction intersecting the first direction with a distance provided therebetween, the distance being equal to or longer than the spatial distance for insulation between sites having potentials different from each other, and
   a combination of the circuit breaker with the high-speed closer and a combination of the capacitor with the lightning arrester are aligned in a third direction that is a direction intersecting the first direction and the second direction with a distance provided therebetween, the distance being equal to or longer than the spatial distance for insulation between sites having potentials different from each other.

2. The direct-current circuit breaker according to claim 1, wherein the first direction, the second direction, and the third direction are perpendicular to one another.

3. The direct-current circuit breaker according to claim 1, wherein the spatial distance is a distance capable of insulating between sites to which a voltage with a maximum value is applied, the maximum value being a maximum value of a voltage applicable to respective points having potentials different from each other in a circuit including the circuit breaker and the circuit portion.

4. The direct-current circuit breaker according to claim 1, wherein each of the circuit breaker, the capacitor, the reactor, the high-speed closer, and the lightning arrester is arranged at a position away from an installation surface on which the direct-current circuit breaker is installed so as to be insulated from the installation surface.

* * * * *